(12) United States Patent
Frazier

(10) Patent No.: US 7,333,725 B1
(45) Date of Patent: Feb. 19, 2008

(54) METHOD AND APPARATUS FOR METADATA SYNCHRONIZATION

(75) Inventor: Brian E Frazier, Santa Rosa, CA (US)

(73) Assignee: L-3 Communications Sonoma EO, Inc., Santa Rosa, CA (US)

( * ) Notice: Subject to any disclaimer, the term of this patent is extended or adjusted under 35 U.S.C. 154(b) by 385 days.

(21) Appl. No.: 11/090,948

(22) Filed: Mar. 24, 2005

(51) Int. Cl.
*G03B 17/40* (2006.01)
*G03B 41/00* (2006.01)
*H04N 9/04* (2006.01)
*G06M 3/02* (2006.01)

(52) U.S. Cl. ............... 396/263; 396/333; 348/207.99; 377/1

(58) Field of Classification Search ........... 396/182, 396/187, 240, 263–265, 325, 332–333, 335, 396/377, 406; 348/495, 521, 64, 207.99, 348/207.11, 211.11; 377/1–2, 20, 130; 375/355, 375/376; 353/84; 356/436; 703/19; 713/375, 713/400–401, 501–502; 710/9, 58; 712/2, 712/9, 10; 709/205, 248, 225
See application file for complete search history.

(56) References Cited

U.S. PATENT DOCUMENTS

| 4,192,595 | A | * | 3/1980 | Wakazono et al. ......... 396/183 |
| 4,449,804 | A | * | 5/1984 | Watanabe et al. .......... 396/165 |
| 4,951,073 | A | * | 8/1990 | Slavitter .................... 396/322 |
| 6,137,749 | A | * | 10/2000 | Sumner ....................... 368/113 |
| 6,295,413 | B1 | * | 9/2001 | Ogasawara ................. 396/155 |
| 6,463,215 | B1 | * | 10/2002 | O'Connolly et al. ....... 396/263 |
| 6,704,460 | B1 | * | 3/2004 | Pitruzzello et al. ......... 382/284 |
| 2002/0126913 | A1 | * | 9/2002 | Kotake et al. .............. 382/282 |

* cited by examiner

*Primary Examiner*—W. B. Perkey
(74) *Attorney, Agent, or Firm*—Pillsbury Winthrop et al

(57) ABSTRACT

A method and apparatus provides for accurately synchronizing a plurality of sensors, as well as for providing accurate timing information (e.g. timing metadata) associated with the synchronized data capture. According to one aspect of the invention, an apparatus includes a synchronization circuit that stores a counter having a value corresponding to the delay characteristics of an associated sensor. The counter is used to provide a synchronization pulse to the associated sensor which is offset from a desired synchronization time by an amount that will compensate for the delay characteristics. In one example, one counter is provided for each associated sensor, allowing a high degree of accuracy in synchronization among a plurality of sensors. According to another aspect of the invention, the synchronization pulses are locked onto and derived from a pulse received from a GPS receiver. The GPS receiver is also used to mark time associated with the generated synchronization pulses, and thus obtain highly accurate time information (e.g. metadata) associated with the synchronization pulses provided to the sensors.

32 Claims, 3 Drawing Sheets

METHOD AND APPARATUS FOR METADATA SYNCHRONIZATION

FIELD OF THE INVENTION

The present invention relates generally to synchronization, and in particular to synchronization of sensor data collection and timing information (e.g. metadata) associated therewith.

BACKGROUND OF THE INVENTION

Many applications require a high degree of synchronization among several different instruments. For example, photogrammetry involves making maps or scale drawings from photographs, especially aerial photographs, or making precise measurements by means of photography. In this example application, where photographs or other image data are received from a plurality of sensors, synchronization between the sensors is very important. Timing errors due to lack of synchronization can lead to errors or inaccuracies in measurements that need to be obtained from the collected sensor data. However, individual sensors can have different characteristics in how they respond to synchronizing signals for collecting data, making synchronization a challenge. Relatedly, timing data associated with the sensor data (e.g. timing metadata) needs to accurately reflect the actual time when the data was captured, which can be further complicated when a plurality of sensors are used and have different synchronization response characteristics.

Accordingly, it would be desirable if there were an apparatus and method that could provide a high degree of synchronization between sensors capturing data, as well as a high degree of accuracy in timing information associated with the captured data.

SUMMARY OF THE INVENTION

The present invention provides a method and apparatus for synchronizing a plurality of sensors, as well as providing accurate timing information (e.g. timing metadata) associated with the synchronized data capture. According to one aspect of the invention, an apparatus includes a synchronization circuit that stores a counter having a value corresponding to the delay characteristics of an associated sensor. The counter is used to provide a synchronization pulse to the associated sensor which is offset from a desired synchronization time by an amount that will compensate for the delay characteristics. In one example, one counter is provided for each associated sensor, allowing a high degree of accuracy in synchronization among a plurality of sensors. According to another aspect of the invention, the synchronization pulses are locked onto and derived from a pulse received from a GPS receiver. The GPS receiver is also used to mark time associated with the generated synchronization pulses, and thus obtain highly accurate time information (e.g. metadata) associated with the synchronization pulses provided to the sensors.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Figure 1:
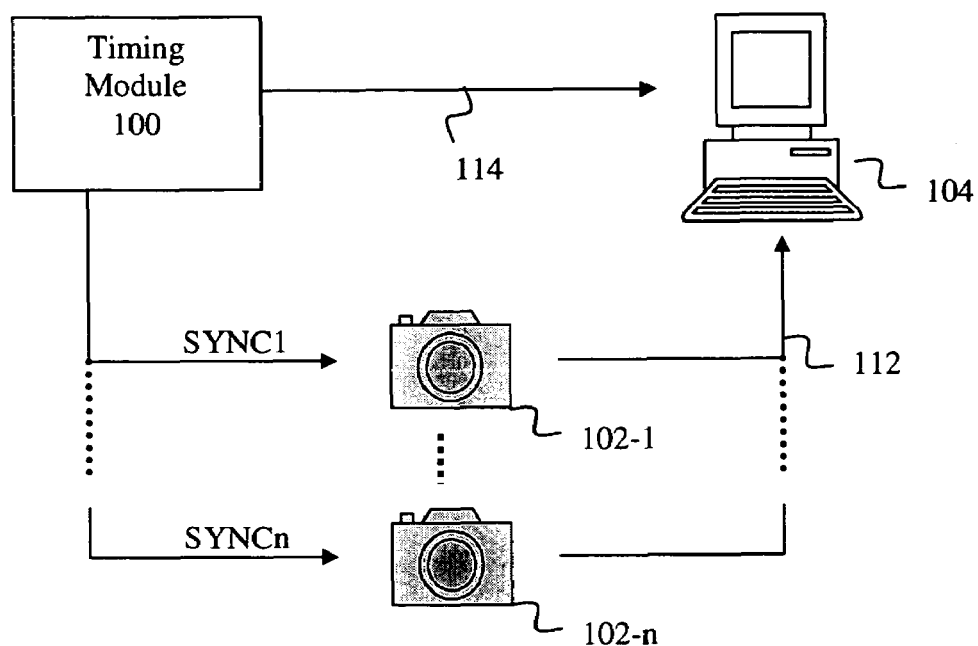
FIG. 1 is a block diagram illustrating an example implementation of an apparatus for metadata synchronization in accordance with the principles of the present invention.

FIG. 1 is a block diagram illustrating an example implementation of an apparatus for metadata synchronization in accordance with the principles of the present invention.

As shown in FIG. 1, timing module 100 provides synchronization pulses SYNC1 . . . SYNCn to a plurality of sensors 102-1 . . . 102-n. The sensors 102 provide image or other sensor data 112 to digitizing computer 104. In a preferred application, sensors 102 are still or video cameras, but the invention is not limited to this example. The timing module 100 also provides synchronization data 114 (i.e. timing metadata) to computer 104 corresponding to the image or other data provided by the sensors 102 to computer 104.

Figure 2:
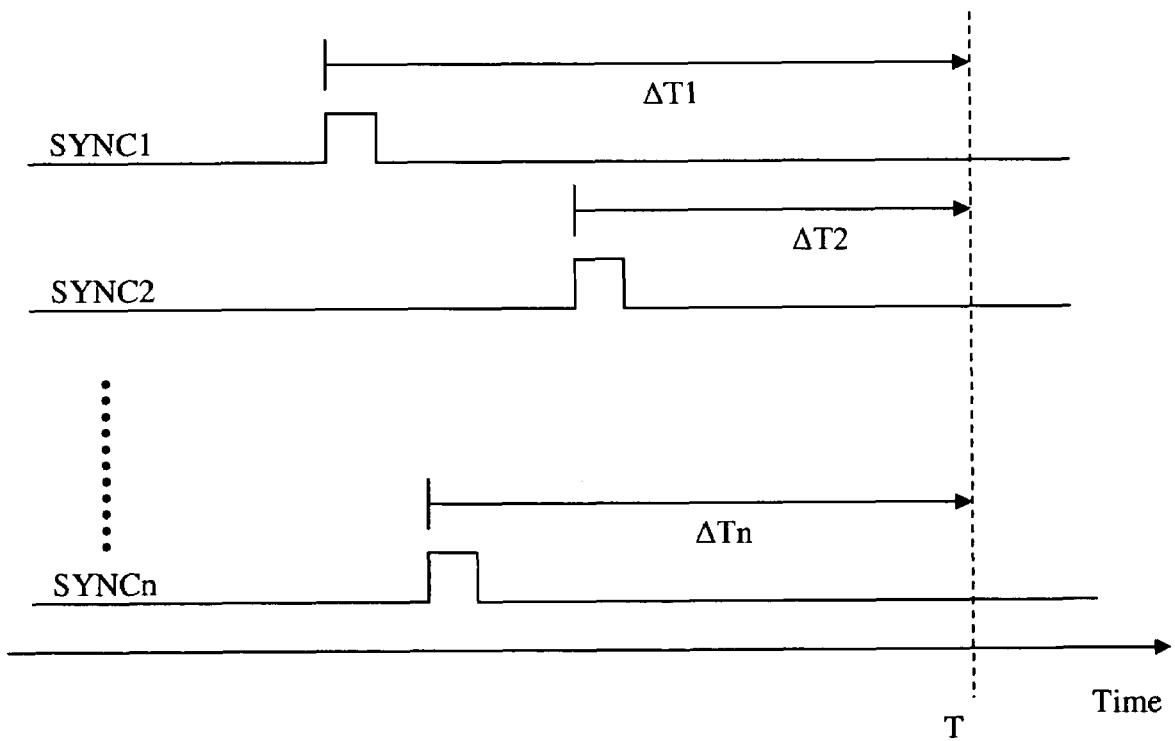
FIG. 2 is a timing diagram for further illustrating the principles of the invention.

FIG. 2 is a timing diagram for further illustrating the principles of the invention. As shown in FIG. 2, it is desired for all the sensors to capture and provide sensor data in accordance with a common synchronization time T. Each sensor 102-1 . . . 102-n has individual delay characteristics that will affect how it responds to a data capturing synchronization signal. These individual delay characteristics are programmed into timing module 100, and are used to adjust the amount of time before the desired time T at which to provide a synchronization pulse to each individual sensor. Accordingly, as shown in FIG. 2, the synchronization pulse SYNC1 is provided to the first sensor at a time ΔT1 before the desired time T, SYNC2 is provided to the second sensor at a time ΔT2 before the desired time T, and SYNCn is provided to the n-th sensor at a time ΔTn before the desired time T. It should be noted that time T can occur at a given rate, such as the frame rate for a camera, and so the synchronization pulses will also be provided at the same rate.

With the synchronization pulses so provided to each individual sensor, the difference between the time they actually capture data in accordance with the synchronization signal, and the desired time T, (i.e. timing error) will be minimized. Moreover, concurrently with the synchronization pulses provided to the sensors, the timing module provides associated timing data to the digitizing computer 104. Because of the accuracy of the synchronization timing between the sensors and the corresponding image data received from the sensors by digitizing computer 104, as well as the accuracy of the timing information (i.e. timing metadata) maintained by the timing module 100 and provided to computer 104, overall accuracy of data collection is greatly improved.

Figure 3:
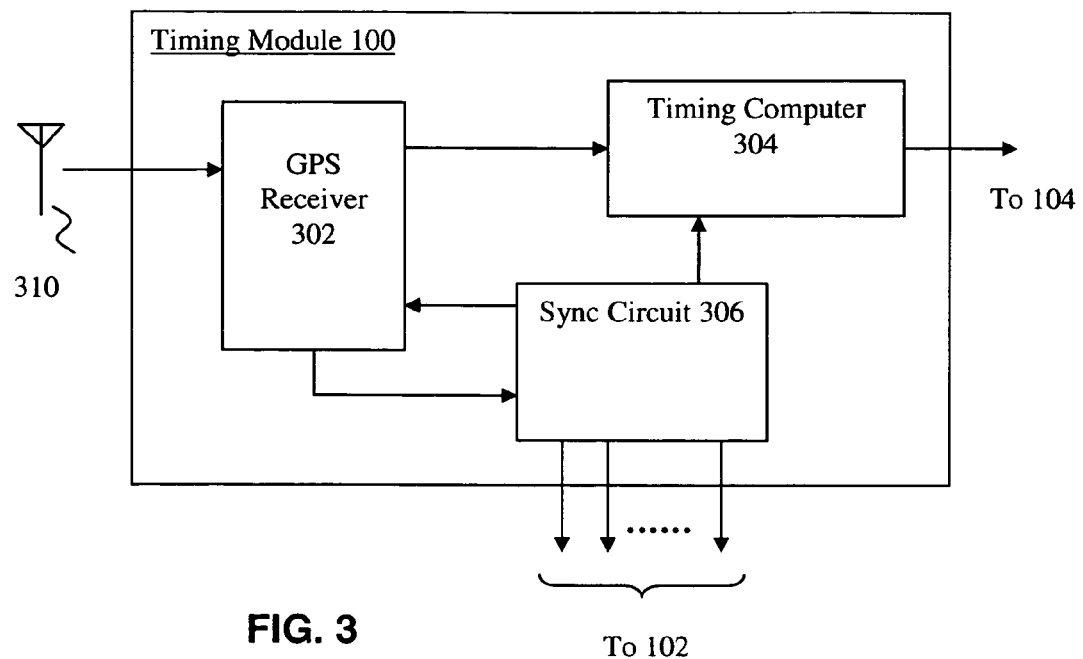
FIG. 3 is a block diagram illustrating an example timing module for use in an apparatus for synchronizing metadata in accordance with the present invention.

FIG. 3 is a block diagram illustrating an example timing module for use in an apparatus for synchronizing metadata in accordance with the present invention.

As shown in FIG. 3, timing module 100 in this example includes GPS receiver 302, timing computer 304 and synchronization circuit 306.

GPS receiver 302 is, for example, a SX-1 from CSI Wireless of Calgary, Alberta. It receives global positioning system (GPS) satellite signals from an antenna 310 and provides a one pulse per second signal to synchronization circuit 306. GPS receiver 302 also provides GPS time information to timing computer 304 and synchronization circuit 306. Although GPS is a preferred source of accurate and reliable timing information, other existing and future possible sources can be used, and the invention is not limited to this example.

Timing computer 304 is, for example, an eZ80 microcontroller from Zilog, Inc. of San Jose, Calif. Timing computer 304 provides sensor delay characteristics to synchronization circuit 306, and receives synchronization information from synchronization circuit 306. Timing computer 304 and synchronization circuit 306 may be connected via a standard microprocessor bus interfaces such as ISA, for example. Timing computer 304 also receives timing information from GPS receiver 302 via a RS232 interface for example. It should be noted that timing computer 304 may also receive GPS timing information such as TSPI or CMigits, from other external GPS sources via an RS232 interface, for example. Timing computer 304 further provides timing metadata to a digitizing or other host computer via a standard network interface such as Ethernet. It should be further noted that timing computer 304 may further use associated program and data memory (not shown).

Synchronization circuit 306 is implemented by, for example, a field programmable gate array (FPGA) chip from Xilinx of San Jose, Calif. It provides synchronization signals to sensors 102-1 . . . 102-n. It also provides a corresponding synchronization signal to timing computer 304, and receives delay characteristics from timing computer 304. It further receives a one pulse per second signal from GPS receiver 302, and also receives GPS time information associated with each one pulse per second signal from GPS receiver 302.

Figure 4:
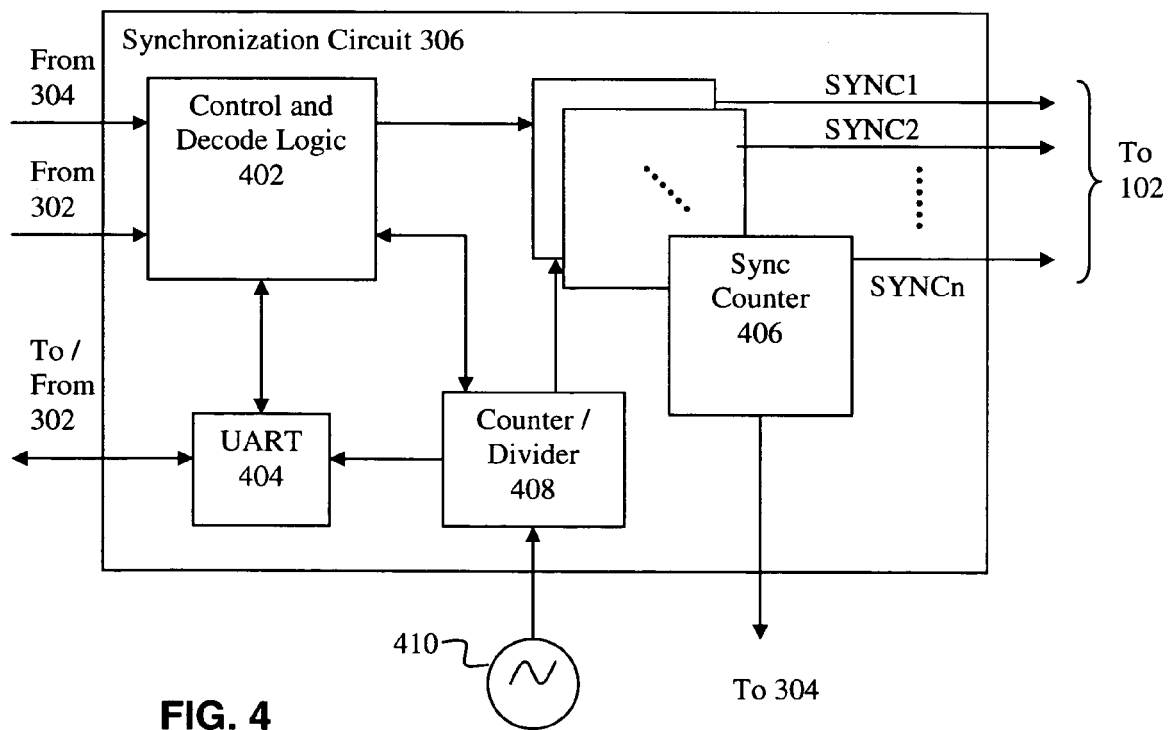
FIG. 4 is a block diagram illustrating an example implementation of synchronization circuit as illustrated in FIG. 3 in more detail.

FIG. 4 is a block diagram illustrating an example implementation of synchronization circuit 306 in more detail. Those skilled in the art will understand how to implement synchronization circuit 306 or portions thereof in a FPGA and/or various alternative forms of hardware and/or software after being taught by the following and foregoing descriptions.

As shown in FIG. 4, this example of synchronization circuit 306 includes control and decode logic 402, UART 404, sync counters 406 and counter/divider 408.

Control and decode logic 402 provides the necessary interface to allow connection to timing computer 304. The control logic will interpret and react to information (e.g. sensor delay characteristics) on the data and address bus of computer 304. Logic 402 further provides bridging between the processor bus and peripherals inside circuit 306 including the UART 404, sync counters 406 and counter/divider 408.

For example, sensor delay characteristics are received by timing computer 304 via a user interface, for example, and computer 304, knowing the rate of the system clock, calculates a count value that will be needed to account for the sensor delay, and provides this count value to logic 402. For example, if the delay value is provided in terms of seconds, computer 304 calculates the number of cycles of a 30 MHz system clock (i.e. number of 33.3 ns clock cycles) that will be associated with that delay value to determine a count value. Logic 402 then provides this count value to the associated sync counter 406 upon command from computer 402.

Similarly, logic 402 provides access by timing computer 304 to the GPS time information received by UART 404 and the sub GPS time count value maintained by counter/divider 408 as will be explained further below. Logic 402 also receives a one pulse per second signal from GPS receiver 302 and provides this to counter/divider 408.

UART 404 provides standard universal asynchronous receiver-transmitter (UART) functionality including transmit and receive features for communicating with GPS receiver 302 via a serial link, for example. UART 404 also listens for and receives an ASCII time code associated with the one pulse per second signal from GPS receiver 302 and provides this to logic 402 for access by timing computer 304. In one possible alternative, GPS time information can be sought and received through a "GPS mark time" mechanism available with certain GPS receivers.

Continuing with this example implementation, there is one sync counter 406 for each sensor that requires synchronization pulses. Each counter is pre-triggered off a 60 Hz clock received from counter/divider 408 as will be explained further below. Each counter includes a preload register to hold a count specific to the sensor receiving that synchronization signal (e.g. the sensor delay characteristics). The preload value corresponds to the time ahead of the actual sync that the sensor receiving the signal will need in order to start capturing at the desired synchronized time. This preload value is received from the timing computer 304 via control and decode logic 402. After the pre-trigger is received, and the corresponding count (e.g. number of 33.3 ns cycles) reaches the corresponding preload value, the synchronization pulse (i.e. SYNC1 . . . SYNCn) for the associated sensor is generated. In addition to providing synchronization signals to each corresponding sensor, sync counters 406 further provide a synchronization signal for use by timing computer 304.

Counter/divider 408 receives clock signals from external sources and divides and distributes them to both internal and external destinations. In one example implementation, counter/divider 408 receives a 30 MHz system clock from an external oscillator 410, as well as a one pulse per second signal from GPS receiver 302 via logic 402. Counter/divider 408 includes a phase locked loop to lock onto the one pulse second signal from GPS receiver 302.

Counter/divider 408 distributes the 30 MHz system clock to sync counters 406, and also divides the system clock down to a 60 Hz clock which is also provided to sync counters 406. The system clock provides the basis for the counters in sync counters 406, giving the counters a resolution of 33.3 nanoseconds. The 60 Hz signal is used to pre-trigger the sync signals from counters 406, and corresponds to the desired frame rate for the sensor data. It should be apparent that other pre-trigger signal rates will be used depending on the particular sensor and/or application.

Counter/divider 408 further includes a counter that runs off the system clock to keep track of the timing offset between the one pulse per second GPS signal and the 60 Hz signal. In other words, when the one pulse per second signal is received, this GPS offset counter is reset, and incremented at each iteration of the 30 MHz system clock. The contents of this counter are made available to the timing computer 304 at every subsequent 60 Hz synchronization signal via control and decode logic 402 and can thus be used to determine the difference in time between the last one pulse per second signal generated by the GPS receiver, and the last subsequent 60 Hz synchronization signal generated. Because the counter runs off the system clock, the resolution of the counter is 33.3 nanoseconds.

Counter/divider 408 also divides the system clock to provide the clock needed for the appropriate baud rate of UART 404.

An example method of operation for providing synchronized metadata using a timing module in accordance with the principles of the invention will now be described in conjunction with FIG. 5.

Figure 5:
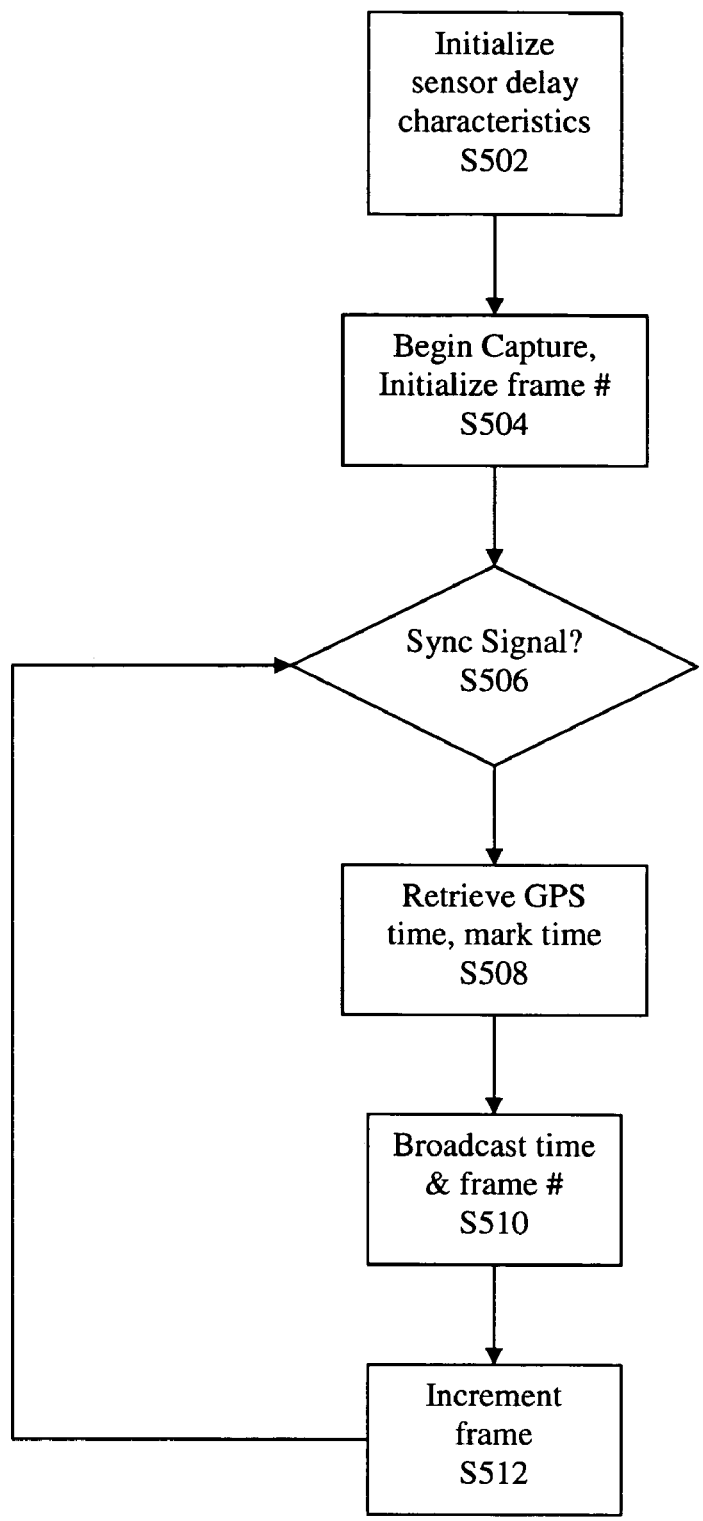
FIG. 5 is a flowchart illustrating an example method of operation for synchronizing metadata using a timing module in accordance with the principles of the invention.

As shown in FIG. 5, processing begins in step S502 by initializing the sensor delay characteristics. In the example implementation of the timing module described above, this step includes causing timing computer 304 to provide the delay characteristics for each sensor to synchronization circuit 306. The delay characteristics are used to initialize the counters that are used by sync counters 406 to generate the synchronization pulses at the appropriate offset from the desired time for the associated sensor.

The particular method used to obtain and program the delay characteristics into counters 406 is a matter of design choice. In one example of the invention, the delay characteristics are obtained from the factory specifications for the associated sensor, or directly from the sensor vendor itself. If the delay characteristic is measured in seconds, the computer 304 can receive this number and calculate a count value based on the system clock (e.g. 30 MHz) that will be used to increment the counters and provide the synchronization pulses. The particular mechanism for providing these characteristics to computer 304 via a user interface, for example, and then for computer 304 loading data corresponding to these characteristics into synchronization circuit 306, is a matter of design choice to those skilled in the art, and details thereof will be omitted so as not to obscure the invention.

Returning to FIG. 5, processing continues by initializing the frame number for a particular data capture, and starting the capture process in step S504.

In operation, the synchronization circuit 306 locks onto the one pulse per second pulse from GPS receiver 302, and operates in accordance with the system clock from oscillator 410. At each frame interval (e.g. at 60 Hz), synchronization circuit 306 provides synchronization pulses to each associated sensor in accordance with the delay characteristics received for each sensor, and also provides a corresponding synchronization pulse to timing computer 304.

Timing computer 304 awaits the synchronization pulse from synchronization circuit 306 in step S506. When it is received, timing computer 304 retrieves the GPS time associated with the last one pulse per second pulse from GPS receiver 302, as well as the offset counter from synchronization circuit 306 in step S508. Using this information, the absolute time associated with the current frame for which the latest synchronization signal was received can be determined. In step S510 the timing computer 304 broadcasts the time information (including for example, the latest GPS time and the current synchronization signal offset) and the frame number, for example to a digitizing computer 104. Computer 304 then increments the frame number in step S512 and returns to step S506 to await the next synchronization signal.

It should be apparent that many alternatives to the above method exist, both in steps performed and particular ordering. For example, it may be possible for the computer 304 itself to calculate and broadcast an absolute time for each frame rather than broadcasting a latest GPS time and a corresponding synchronization signal offset.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A timing apparatus comprising:
a first synchronization counter that receives a system clock and a pre-trigger, the first synchronization counter generating a first synchronization signal that is offset from the pre-trigger based on a first count of the system clock and a first delay characteristic, the first synchronization signal triggering a first data capture time; and
a second synchronization counter that receives the system clock and the pre-trigger, the second synchronization counter generating a second synchronization signal different from the first synchronization signal and that is offset from the pre-trigger based on a second count of the system clock and a second delay characteristic, the second synchronization signal triggering a second data capture time,
wherein the respective offsets of the first and second synchronization signals from the common pre-trigger compensate for the respective first and second delay characteristics and cause the first and second data capture times to occur at substantially the same absolute time.

2. A timing apparatus according to claim 1, wherein the first and second delay characteristics are associated with first and second sensors that receive the first and second synchronization signals, respectively.

3. A timing apparatus according to claim 1, wherein the first and second counts have a resolution of less than 50 nanoseconds.

4. A timing apparatus according to claim 1, further comprising a divider circuit that generates the pre-trigger based on a desired frame rate.

5. A timing apparatus according to claim 2, further comprising a divider circuit that generates the pre-trigger based on a desired frame rate.

6. A timing apparatus according to claim 4, wherein the divider circuit generates the pre-trigger by dividing the system clock.

7. A timing apparatus according to claim 5, wherein the divider circuit generates the pre-trigger by dividing the system clock.

8. A timing apparatus according to claim 1, further comprising first and second pre-load registers for storing count values corresponding to the first and second delay characteristics, respectively, the first and second synchronization circuits using the count values to compare to the first and second counts of the system clock in determining when to generate the first and second synchronization signals, respectively.

9. A timing apparatus according to claim 2, further comprising first and second pre-load registers for storing count values corresponding to the first and second delay characteristics, respectively, the first and second synchronization circuits using the count values to compare to the first and second counts of the system clock in determining when to generate the first and second synchronization signals, respectively.

10. A timing apparatus according to claim 2, wherein the first and second delay characteristics correspond to an absolute time after the first and second synchronization signals at which the first and second sensors capture data, respectively.

11. A timing apparatus according to claim 6, wherein the first and second delay characteristics correspond to an absolute time after the first and second synchronization signals at which the first and second sensors capture data, respectively.

12. An apparatus for synchronizing timing metadata associated with sensor data, comprising:
   a reliable time source that provides a periodic pulse; and
   a synchronization circuit that provides synchronization signals to a plurality of sensors based on a common pre-trigger, the timing module accounting for respective delay characteristics of the sensors so that they all capture data at approximately the same absolute time in response to the synchronization signals, the synchronization circuit receiving the periodic pulse and determining a timing offset between the periodic pulse and the common pre-trigger.

13. An apparatus according to claim 12, wherein the reliable time source is a GPS receiver.

14. An apparatus according to claim 12, wherein the common pre-trigger has a rate corresponding to a desired frame rate of the sensor data.

15. An apparatus according to claim 12, further comprising a timing computer that receives the timing offset and certain of the synchronization signals and updates a frame counter corresponding to the captured data.

16. An apparatus according to claim 12, further comprising a timing computer that receives the timing offset from the synchronization circuit and absolute time information from the reliable time source, the timing computer making the timing offset and absolute time information available to external devices that use the captured data from the sensors so that the same absolute time can be determined and associated with the captured data from the sensors.

17. An apparatus according to claim 12, wherein the synchronization circuit includes:
   a circuit for distributing a system clock;
   a first synchronization counter that receives the system clock and the pre-trigger, the first synchronization counter generating a first one of the synchronization signals that is offset from the pre-trigger based on a first count of the system clock and a first one of the delay characteristics; and
   a second synchronization counter that receives the system clock and the pre-trigger, the second synchronization counter generating a second one of the synchronization signals different from the first synchronization signal and that is offset from the pre-trigger based on a second count of the system clock and a second one of the delay characteristics.

18. An apparatus according to claim 17, wherein the first and second counts have a resolution of less than 50 nanoseconds.

19. An apparatus according to claim 17, further comprising a divider circuit that generates the pre-trigger based on a desired frame rate of the sensor data.

20. An apparatus according to claim 19, wherein the divider circuit generates the pre-trigger by dividing the system clock.

21. An apparatus according to claim 17, further comprising first and second pre-load registers for storing count values corresponding to the first and second delay characteristics, respectively, the first and second synchronization circuits using the count values to compare to the first and second counts of the system clock in determining when to generate the first and second synchronization signals, respectively.

22. An apparatus according to claim 21, further comprising a timing computer that receives the first and second delay characteristics and computes the count values for storing in the first and second pre-load registers.

23. A method of synchronizing timing metadata associated with sensor data, comprising:
   receiving a periodic pulse from a reliable time source;
   generating synchronization signals to a plurality of sensors based on a common pre-trigger, the synchronization signals being offset from the common pre-trigger in accordance with respective delay characteristics of the sensors so that they all capture data at approximately the same absolute time in response to the synchronization signals; and
   determining a timing offset between the periodic pulse and the common pre-trigger.

24. A method according to claim 23, wherein the reliable time source is a GPS receiver.

25. A method according to claim 23, wherein the common pre-trigger has a rate corresponding to a desired frame rate of the sensor data.

26. A method according to claim 23, further comprising:
   updating a frame counter corresponding to the captured data in accordance with the synchronization signals.

27. A method according to claim 23, further comprising:
   receiving the timing offset;
   receiving absolute time information from the reliable time source;
   making the timing offset and absolute time information available to external devices that use the captured data from the sensors so that the same absolute time can be determined and associated with the captured data from the sensors.

28. A method according to claim 23, wherein the step of generating the synchronization signals includes:
   receiving a system clock and the pre-trigger;
   generating a first one of the synchronization signals that is offset from the pre-trigger based on a first count of the system clock and a first one of the delay characteristics; and generating a second one of the synchronization signals different from the first synchronization signal and that is offset from the pre-trigger based on a second count of the system clock and a second one of the delay characteristics.

29. A method according to claim 28, wherein the first and second counts have a resolution of less than 50 nanoseconds.

30. A method according to claim 28, further comprising: generating the pre-trigger by dividing the system clock.

31. A method according to claim 28, further comprising: storing count values corresponding to the first and second delay characteristics, using the count values to compare to the first and second counts of the system clock in determining when to generate the first and second synchronization signals, respectively.

32. A method according to claim 31, further comprising:

receiving information corresponding to the first and second delay characteristics; and computing the count values for storing.

\* \* \* \* \*